US008237109B2

(12) United States Patent
Guna et al.

(10) Patent No.: US 8,237,109 B2
(45) Date of Patent: Aug. 7, 2012

(54) METHODS FOR FRAGMENTING IONS IN A LINEAR ION TRAP

(75) Inventors: Mircea Guna, Toronto (CA); Bruce Collings, Bradford (CA)

(73) Assignee: DH Technologies Development Pte. Ltd., Singapore (SG)

( * ) Notice: Subject to any disclaimer, the term of this patent is extended or adjusted under 35 U.S.C. 154(b) by 558 days.

(21) Appl. No.: 12/359,621

(22) Filed: Jan. 26, 2009

(65) Prior Publication Data

US 2009/0194686 A1 Aug. 6, 2009

Related U.S. Application Data

(60) Provisional application No. 61/025,023, filed on Jan. 31, 2008.

(51) Int. Cl.
*B01D 59/44* (2006.01)
*H01J 49/00* (2006.01)

(52) U.S. Cl. ........ 250/283; 250/281; 250/282; 250/287; 250/288; 250/289; 250/290; 250/291; 250/292

(58) Field of Classification Search .......... 250/281–283, 250/287–289, 290–292
See application file for complete search history.

(56) References Cited

U.S. PATENT DOCUMENTS 6,833,544 B1 12/2004 Campbell et al.
6,949,743 B1 9/2005 Schwartz
6,960,762 B2 * 11/2005 Kawato et al. ................ 250/288
6,992,285 B1 1/2006 Cousins et al.
7,227,137 B2 * 6/2007 Londry et al. ................ 250/292
2009/0194684 A1 * 8/2009 Guna et al. .................... 250/282

OTHER PUBLICATIONS

T. J. Carlin, B.S. Freiser, "Pulsed Valve Addition of Collision and Reagent Gases in Fourier Transform Mass Spectrometry", Analytical Chemistry, vol. 55, No. 3, Mar. 1983, 571-574.
J. Murrell et al., "'Fast Excitation' CID in a Quadrupole Ion Trap Mass Spectrometer", American Society for Mass Spectrometry, 2003, 14, 785-789.
Brad I. Coopersmith and Richard A. Yost, "Internal Pulsed Valve Sample Introduction on a Quadrupole Ion Trap Mass Spectrometer"; American Society for Mass Spectrometry, 1995, 6, 976-980.
Richard W. Vachet and Gary L. Glish, "Effects if Heavy Gases on the Tandem Mass Spectra of Peptide Ions in the Quadrupole Ion Trap", American Society for Mass Spectrometry, 1996, 7, 1194-1202.
Vladimir M. Doroshenko and Robert J. Cotter, "Pulsed Gas Introduction for Increasing Peptide CID Efficiency in a MALDI/ Quadrupole Ion Trap Mass Spectrometer", Analytical Chemistry, vol. 68, No. 3, Feb. 1, 1996, pp. 463-472.
PCT/CA2009/000090: International Search Report and Written Opinion, dated Apr. 29, 2009.
Charles, et al., "Competition between Resonance Ejection and Ion Dissociation during Resonant Excitation in a Quadrupole Ion Trap," (American Society for Mass Spectrometry, 1994, 5, 1031-1041).

* cited by examiner

*Primary Examiner* — Jack Berman
*Assistant Examiner* — Meenakshi Sahu

(57) ABSTRACT

Methods for fragmenting ions retained in an ion trap are described. In various embodiments, a non-steady-state pressure of a neutral collision gas of less than about $5\times10^{-4}$ Torr and an excitation amplitude of less than about 500 mV (peak to ground) is used to fragment ions with greater than about 80% fragmentation efficiency. In various embodiments, duration of ion excitation is greater than about 25 ms.

15 Claims, 7 Drawing Sheets

METHODS FOR FRAGMENTING IONS IN A LINEAR ION TRAP

This is a non-provisional application of U.S. application No. 61/025,023 filed Jan. 31, 2008. The contents of U.S. application No. 61/025,023 are incorporated herein by reference.

INTRODUCTION

Ion traps are scientific instruments useful for the study and analysis of molecules. These instruments contain multiple electrodes, surrounding a small region of space, in which ions are confined. The electrodes create an electric potential-well within the ion-confinement region. Ions which move into this potential well become "trapped," i.e. restricted in motion to the ion-confinement region.

During their retention in the trap, a collection of ionized molecules may be subjected to various operations. The ions can then be ejected from the trap and sent into a mass spectrometer, where a mass spectrum of the collection of ions can be obtained. The spectrum reveals information about the composition of the ions. Following this procedure the chemical makeup of an unknown sample can be discerned, providing useful information for the fields of medicine, chemistry, security, criminology, and others.

SUMMARY

Improved MS3 performance can obtained in a low pressure LIT with the introduction of a pulsed collision gas. Experiments were carried out on a heavily modified 4000 Q Trap. Samples included 100 pg/μl Caffeine (138 and 195 m/z), Lidocaine (235 m/z), 5-FU (129 m/z) and Tuarocholic acid (514 m/z). Samples were infused at 10.0 μl/min. Data was collected using excitation periods from 5 to 200 ms and excitations were carried out at Mathieu q=0.236.

Ion fragmentation is a process which breaks apart, or dissociates, an ion into some or all of its constituent parts. Commonly, this is carried out in an ion trap by applying an alternating electric potential (RF potential) to electrodes of the trap to impart kinetic energy to the ions in the trap. The accelerated ions can collide with other molecules within the trap, resulting in fragmentation of the ions for sufficiently high collision energies. However, not all RF potentials result in fragmentation of the ions. Some RF potentials due, for example, to the RF frequency, amplitude or both, place ions on trajectories such that the ions collide with elements of the ion trap, or are ejected from the trap. Other oscillatory motions may not be of sufficient amplitude, and thus impart insufficient energy to fragment the ions. In some of these low-amplitude, low-energy cases, the ions may even lose energy during a collision. In addition, it has been generally thought that high collision gas pressures, e.g. in the $10^{-3}$ Torr and greater range, and/or high excitation amplitudes, e.g. in the 600 mV (ground to peak) and greater range, are necessary to achieve high fragmentation efficiency.

In various embodiments, provided are methods for operation of an ion trap that produce fragment ions using lower collision gas pressures and lower RF excitation amplitudes than used in traditional methods. In various embodiments, provided are methods that using lower collision gas pressures, lower RF excitation amplitudes and longer excitation times than in traditional methods. In various embodiments, methods are provided for use with a linear ion trap comprising a RF multipole where the rods (radial confinement electrodes) of the multipole have substantially circular cross-sections.

In various aspects, the present teachings provide methods for fragmenting ions in a linear ion trap at pressures less than about $5\times10^{-4}$ Torr and with excitation amplitudes of less than about 500 millivolts (mV) (ground to peak). In various embodiments, provided are methods for fragmenting ions in a linear ion trap at pressures less than about $5\times10^{-4}$ Torr, with excitation amplitudes of less than about 500 millivolts (mV) (ground to peak) at fragmentation efficiencies of greater than about 80% for ion excitation times of less than about 25 ms.

In various embodiments, provided are methods for fragmenting ions in an ion trap at a collision gas pressure of one or more of: (a) less than about $5\times10^{-4}$ Torr; (b) less than about $3\times10^{-4}$ Torr; and/or (c) in the range between about $1\times10^{-4}$ Torr to about $5\times10^{-4}$ Torr auxiliary alternating electrical field having a excitation amplitude of one or more of: (a) less than about 500 mV (ground to peak); (b) less than about 250 mV (ground to peak); (c) less than about 100 mV (ground to peak); (d) less than about 50 mV (ground to peak); (e) in the range between about 5 mV (ground to peak) to about 500 mV (ground to peak); and/or (f) in the range between about 5 mV (ground to peak) to about 250 mV (ground to peak). In various embodiments, the auxiliary alternating electrical field is applied for a time (an excitation time) that is one or more of: (a) greater than about 10 milliseconds (ms); (b) greater than about 20 ms; (a) greater than about 30 ms; and/or (c) in the range between about 5 ms and about 25 ms.

In various embodiments, while the ions are retained in the trap, a neutral gas is delivered, e.g., by injection with a pulsed valve, into the trap for a duration of less than about 30 milliseconds. In various embodiments, the delivery of neutral gas is terminated prior to the end of the ion retention time. In various embodiments, the auxiliary alternating potential is applied substantially coincidentally with the injection of the neutral gas into the trap, e.g., the auxiliary alternating potential initiates at substantially the same time with the initiation of gas injection and terminates at substantially the same time with the termination of gas injection. In various embodiments, the auxiliary alternating potential continues to be applied after the termination of the delivery of the neutral collision gas. After the excitation time the residual gas can be evacuated from the ion chamber, so that the pressure within the chamber restores to a first restored pressure value suitable for further ion processing, e.g., for ion cooling, subsequent ion processing, etc., including, but not limited to, ion selection, ion detection, excitation, cooling and mass analyzing. In various embodiments, the first restored pressure value can be in a range between about $2\times10^{-5}$ Torr to about $5.5\times10^{-5}$ Torr.

In various embodiments, the ion trap comprises a quadrupole linear ion trap, having rods (radial electrodes) with substantially circular cross-sections that can produce ion-trapping fields having nonlinear retarding potentials. In various embodiments, the substantially circular cross-section electrodes facilitate reducing losses of ions due to collisions with the electrodes through a dephasing of the trapping RF field and the ion motion.

In various embodiments, provided are methods for fragmenting ions comprising the steps of: (a) retaining the ions in an ion-confinement region of an ion trap for a retention time; (b) creating a non-steady-state pressure increase within the ion-confinement region by delivering a neutral gas into the ion trap for at least a portion of the retention time to raise the pressure in the ion-confinement region to a varying first elevated-pressure that has values which are in the range between about $5.5\times10^{-5}$ to about $5\times10^{-4}$ Torr for a first elevated-pressure duration; (c) exciting at least a portion of the ions within the ion-confinement region by subjecting them to an auxiliary alternating electrical field having an amplitude of less than about 500 mV (ground to peak) for an excitation time, the excitation time being less than the retention time; (d) reducing the pressure within the ion trap to a first restored pressure value prior to the end of the retention time; and (e) ejecting the ions from the ion trap at the end of the retention time. In various embodiments, the ejected ions are subjected to further ion processing, e.g., ion selection, ion detection, excitation, cooling and mass analysis.

In various embodiments, the background pressure is normally between about $2\times10^{-5}$ Torr to about $5.5\times10^{-5}$ Torr before the pressure is elevated, e.g., activation of a pulsed valve. Once the pulsed valve is open the pressure will increase rapidly. To what value depends upon the backing pressure of the valve and duration that the valve is open. In various embodiments, increasing the local pressure by a factor of two will increase the collision rate by about a factor of two which can lead to a reduction in the excitation period of about a factor of two. In various embodiments, the methods create a non-steady-state pressure increase within the ion-confinement region by delivering a neutral gas into the ion trap for at least a portion of the retention time to raise the pressure in the ion-confinement region to a varying first elevated-pressure that has values which are in the range between about 10% above the background pressure to about $5\times10^{-4}$ Torr for a first elevated-pressure duration.

In various embodiments, the varying first elevated pressure is one or more of: (a) less than about $5\times10^{-4}$ Torr; (b) less than about $3\times10^{-4}$ Torr; (c) in the range between about $5.5\times10^{-5}$ Torr to about $5\times10^{-4}$ Torr; (d) in the range between about $5.5\times10^{-5}$ Torr to about $3\times10^{-4}$ Torr; and/or (e) in the range between about $1\times10^{-4}$ Torr to about $5\times10^{-4}$ Torr. A variety of neutral gases can be used to create the non-steady state pressure increase including, but not limited to, hydrogen, helium, nitrogen, argon, oxygen, xenon, krypton, methane, and combinations thereof.

In various embodiments, the amplitude of the auxiliary alternating potential, or excitation amplitude, is one or more of: (a) less than about 500 mV (ground to peak); (b) less than about 250 mV (ground to peak); (c) less than about 100 mV (ground to peak); (d) less than about 50 mV (ground to peak); (e) in the range between about 5 mV (ground to peak) to about 500 mV (ground to peak); and/or (f) in the range between about 5 mV (ground to peak) to about 250 mV (ground to peak). In various embodiments, the auxiliary alternating potential is applied for an excitation time that is one or more of: (a) greater than about 10 milliseconds (ms); (b) greater than about 20 ms; (a) greater than about 30 ms; and/or (c) in the range between about 5 ms and about 25 ms. The duration of application of the auxiliary alternating potential can be chosen to substantially coincide with the delivery of the neutral gas.

In various embodiments, the amplitude of the auxiliary alternating potential can be selected to be in a pre-desired range corresponding to a particular mass range, and/or mass ranges, of ions to be excited. For example, the excitation amplitude can be: in a range between about 10 $\text{millivolts}_{(0\text{-}pk)}$ to about 50 $\text{millivolts}_{(0\text{-}pk)}$ for ions having a mass within a range between about 50 Da to about 500 Da; in a range between about 50 $\text{millivolts}_{(0\text{-}pk)}$ to about 250 $\text{millivolts}_{(0\text{-}pk)}$ for ions having a mass within a range between about 500 Da to about 5000 Da; etc.

In various embodiments of the methods for fragmenting ions, prior to the step of ejecting ions, in various embodiments the methods comprise (i) injecting a cooling gas of neutral molecules into the ion-confinement region to raise the pressure in the ion-confinement region up to a pressure that is greater than about $8\times10^{-5}$ Torr; (ii) creating a non-steady-state pressure within the ion-confinement region, the non-steady-state pressure elevating above a second elevated pressure value for a second elevated-pressure duration; and (ii) reducing the pressure within the ion trap to a second restored pressure value prior to the end of the retention time. In various embodiments, the second elevated pressure value is greater than about $1\times10^{-4}$ Torr. In various embodiments, the second restored pressure value is in the range between about $2\times10^{-5}$ Torr to about $5.5\times10^{-5}$ Torr.

The foregoing and other aspects, embodiments, and features of the present teachings can be more fully understood from the following description in conjunction with the accompanying drawings. The skilled artisan will understand that the drawings, described herein, are for illustration purposes only. In the drawings, like reference characters generally refer to like features and structural elements throughout the various figures. The drawings are not necessarily to scale, emphasis instead being placed upon illustrating the principles of the teachings. The drawings are not intended to limit the scope of the present teachings in any way.

BRIEF DESCRIPTION OF THE DRAWINGS

In the drawings the present teachings are illustrated using a quadrupole linear ion trap, however it is to be understood that the present teachings are not so limited and can be applied to other types of ion traps, including but not limited to hexapole linear ion traps, and multipole linear ion traps.

DETAILED DESCRIPTION OF THE VARIOUS EMBODIMENTS

Prior to further describing various embodiments of the present teachings it may be useful to an understanding there of to describe the use of various terms used herein and in the art.

One figure of merit for the ion fragmentation process is "fragmentation efficiency," a measure of the amount of parent molecules which are converted into fragments. A fragmentation efficiency of 100% means that all parent molecules have been broken into one or more constituent parts. Additional figures of merit include the speed at which the fragments can be produced, and the speed at which they can be made available for subsequent ion processing.

A variety of ion traps are known, one type of ion trap is the linear ion trap comprising a RF multipole for radial confinement of the ions and often end electrodes for axial confinement of ions. A RF multipole comprises an even number of elongate electrodes commonly referred to as rods, which are also referred to as radial confinement electrodes herein to distinguish them from end electrodes often found in linear ion traps. A RF multipole with four rods is called a quadrupole, one with six a hexapole, with eight an octopole, etc. The cross-sections of these electrodes (although commonly called rods) are not necessarily circular, rather hyperbolic cross-section electrodes (electrodes where opposing faces have a hyperbolic shape) are considered in the art to provide better performance. See, e.g., "Prediction of quadrupole mass filter performance for hyperbolic and circular cross section electrodes" by John Raymond Gibson and Stephen Taylor, Rapid Communications in Mass Spectrometry, Vol. 14, Issue 18, Pages 1669-1673 (2000). In various embodiments, a RF multipole can be used to trap, filter, and/or guide ions by application of a DC and AC potential to the rods of the multipole. The AC component of the electrical potential is often called the RF component, and can be described by the amplitude and the oscillatory frequency. More than one RF component can be applied to an RF multipole. In various embodiments of an ion trap, a trapping RF component is applied to radially confine ions within the multipole and an auxiliary RF component, applied across two or more opposing rods of the multipole for an ion excitation time, can be used to impart translational energy to the ions.

As used herein, the notation (0-pk) represents the peak amplitude of an alternating potential (RF potential), as measured from ground potential, applied across the poles of an ion trap. For example, in a quadrapole ion trap such as that depicted in FIG. 2B, two of the rods 210, upper right and lower left, form one pole and the other two rods form a second pole. For this example, a sinusoidal-type alternating potential, alternating between positive 5 volts and negative 5 volts applied across the two poles, would be represented as 5 $\text{volts}_{(0\text{-}pk)}$.

Figure 1:
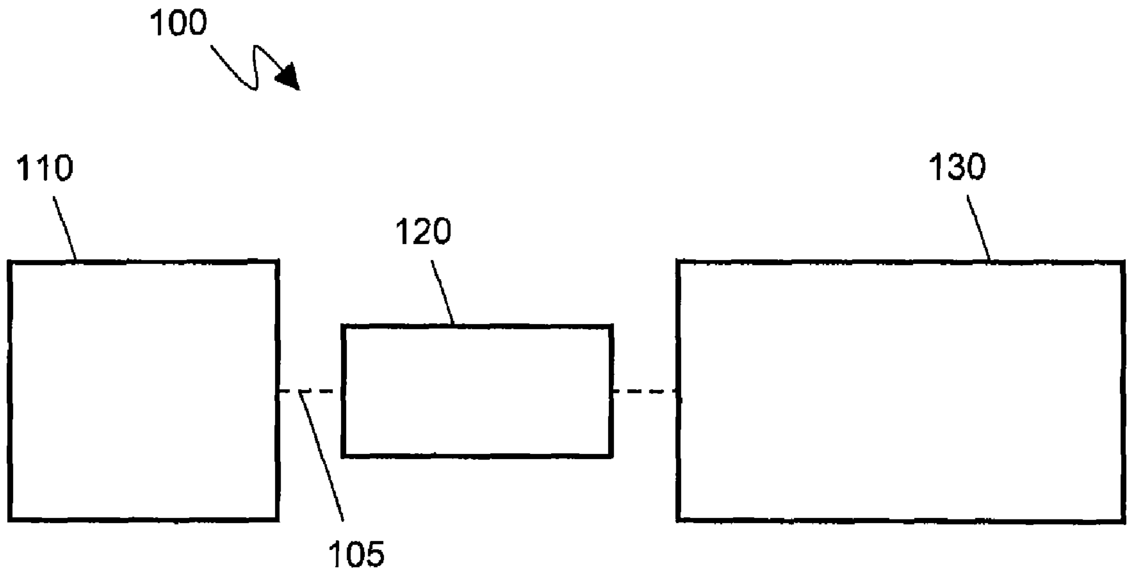
FIG. 1 illustrates a schematic block diagram of an ion-analysis apparatus having a linear ion trap (LIT).
Figure 2A:
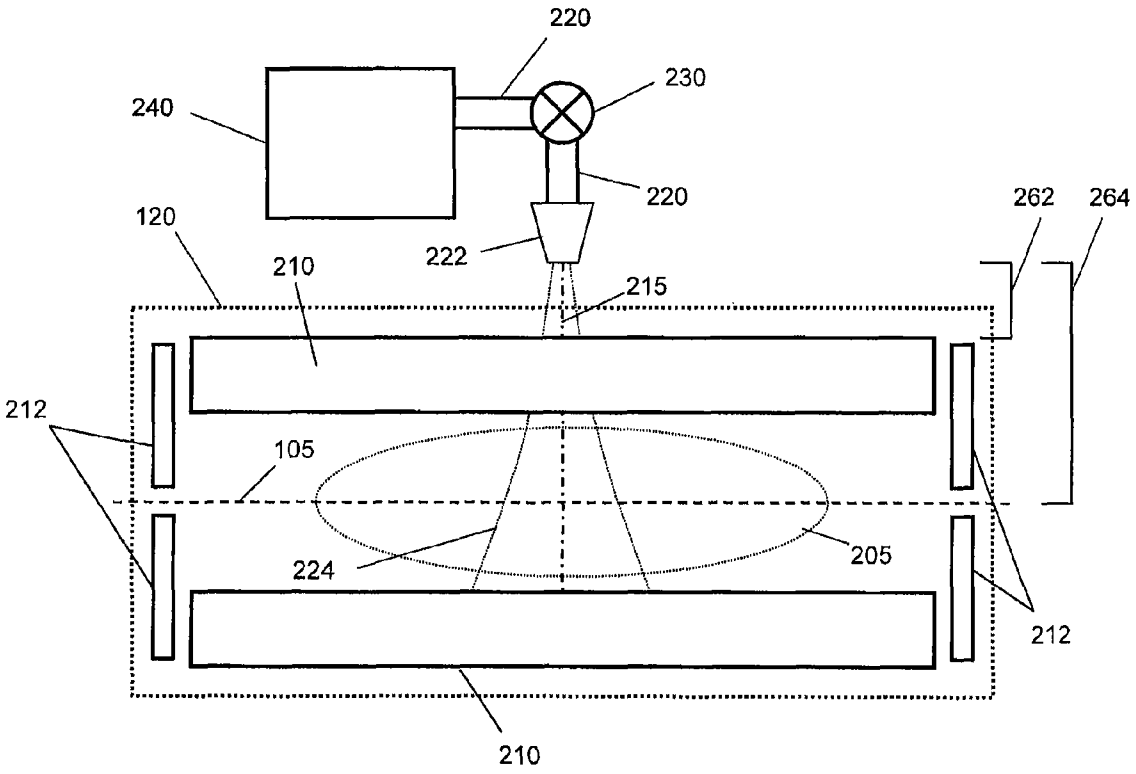
FIG. 2A is an elevational side view schematically depicting a quadrupole linear ion trap and apparatus to inject a gas of neutral collision molecules into the trap.
Figure 2B:
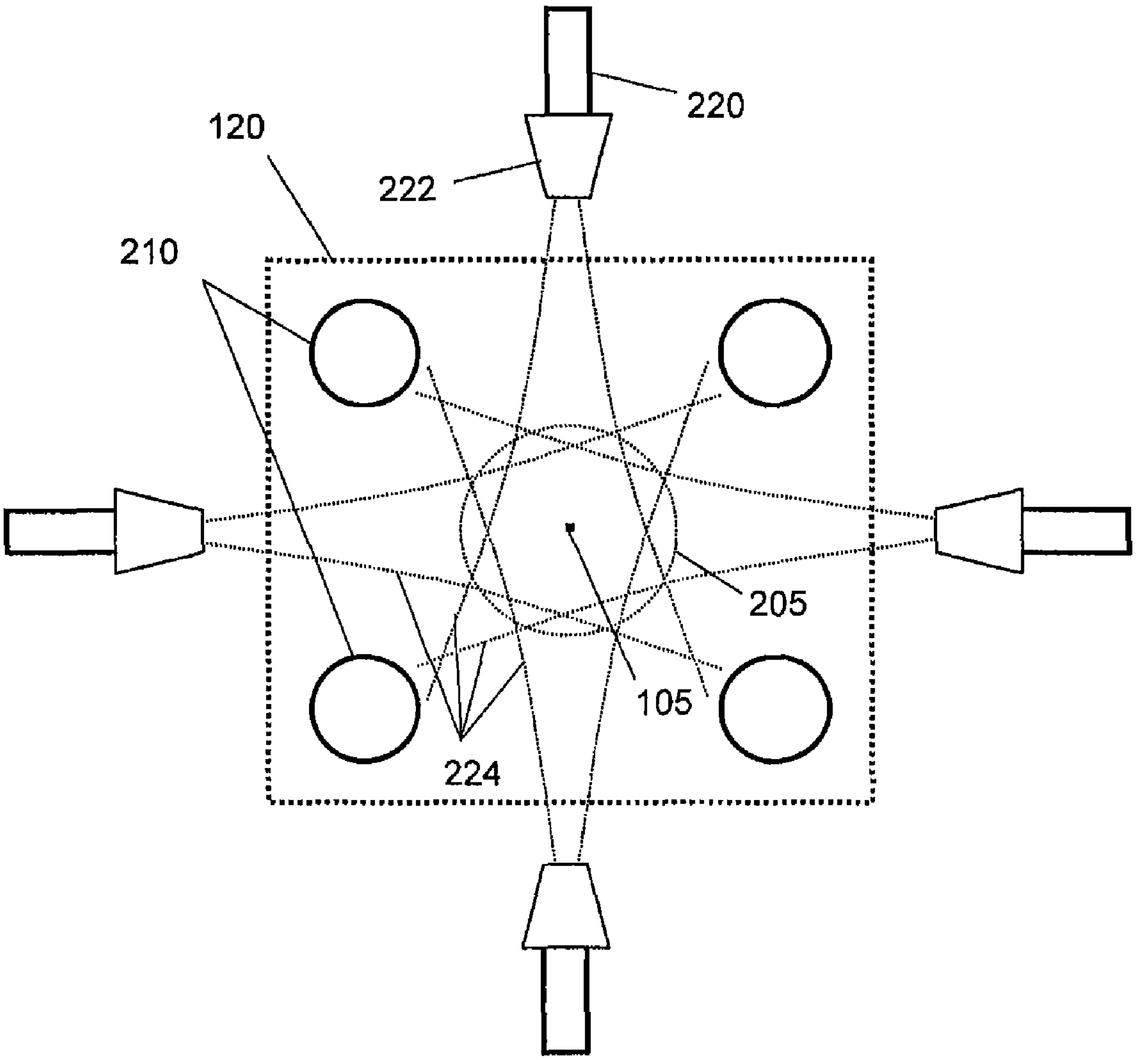
FIG. 2B is an elevational end view of the quadrupole trap schematically portrayed in FIG. 2A. Three gas-injecting nozzles have been added to depict various embodiments.

To better facilitate understanding the present teachings, various aspects and embodiments of the methods are discussed in the context of FIGS. 1 and 2A-2B. The block diagram of FIG. 1, schematically depicts an ion-analysis apparatus comprising an ion trap 120, disposed between a source of ions 110, and an ion post-processing element 130. In various embodiments, the source of ions 110 can be, e.g., an ionization source (e.g. the outlet of an electrospray source), the outlet of a mass spectrometer, etc., and the post-processing element 130 can be, e.g., a mass spectrometer, a tandem mass spectrometer or an ion-detection apparatus. In various embodiments, the ion trap comprises a linear ion trap (LIT) such as, e.g., a quadrupole LIT The ion trap 120 can comprise, e.g., several similar ion traps arranged, for example, in series. The ion trap 120 can be one of several types of ion traps including, but not limited to, a quadrupole linear ion trap, a hexapole linear ion trap, and a multipole linear ion trap. In various embodiments, the ion trap 120 is a quadrupole linear ion trap having ion-confining electrodes, oriented substantially parallel to an ion path 105. In various embodiments, the rods (radial confinement electrodes) of the quadrupole linear ion trap have substantially circular cross sections.

Typically in an ion-analysis apparatus having an ion trap, ions originating from the source of ions 110, (typically in gaseous form) are transported substantially along an ion path 105 into the ion trap 120. The path of ion transport is often referred to as the ion axis and does not necessarily need to be linear, that is the path may bend one or more times. The ion axis through the ion trap is typically considered the axial direction within the trap and directions perpendicular to the ion path within the trap are considered radial directions. The ion trap can be used to spatially constrain the ions, and retain them for a period of time within the trap. During this retention time, one or more ion-related operations can be performed such as, for example, electrical excitation, fragmentation, selection, chemical reaction, cooling, spectrometric measurements, etc. Subsequent to the retention time, ions are ejected from the ion trap into an ion post-processing element 130, such as, e.g., a detector, a mass spectrometer, etc. The ejection of the ions from, for example, a LIT can occur, for example, via ejection of the entire ion population along the axis 105 of the ion trap, via mass selective axial ejection (MSAE), via radial ejection from the trap, etc.

In operation, the transfer of ions from a source of ions to an ion trap, and from an ion trap to a post-processing element typically occurs under reduced pressure, typically less than about $10^{-3}$ Torr to avoid, e.g., ion loss, reactions of ions with other gases, excessive detector noise, etc. This pressure is often referred to as the base pressure or ambient pressure existing in the ion trap chamber 120 when no processing operations are occurring in the trap, e.g., when no collision or cooling gas has been added to the ion trap. In various embodiments, the steady-state background pressure is less than about $5\times10^{-5}$ Torr. The loss of ions upon ejection from the ion trap and/or efficiency of transporting them from the ion trap to a post-processing element can depend upon the ambient pressure. In various embodiments, upon ejection of ions from the trap, the pressure is between about $2\times10^{-5}$ Torr to about $5.5\times10^{-5}$ Torr. In various embodiments, the pressure is between about $2\times10^{-5}$ Torr to about $7.5\times10^{-5}$ Torr. In various embodiments, the pressure is between about $2\times10^{-5}$ Torr to about $10^{-4}$ Torr.

Referring to FIGS. 2A-2B, various embodiments of a multipole LIT are depicted schematically. In various embodiments, a multipole LIT comprises four rod-like electrodes 210, radial confinement electrodes, configured to run substantially parallel to the ion path 105 and end-cap electrodes 212 that facilitate the axial confinement of the ions. Electric potentials with DC and AC components can be applied to the rods 210 and end-cap electrodes creating an electric field which confines ions to an ion-confinement region 205 within the trap.

Ions retained within the ion-confining region 205 can be excited by applying an auxiliary alternating potential across at least two of the rods 210 located on opposite sides of the region 205. The auxiliary potential creates an alternating electrical field within the confinement region, which accelerates the ions in an oscillatory motion within the trap. The ions can gain kinetic energy as long as the auxiliary potential is applied. The kinetic energy gained can be transferred into internal ion energy (e.g. vibration, rotation, electronic excitation) when an ion undergoes a collision with another molecule or atom. The internal energy of the ion can increase with multiple successive collisions. When sufficient internal energy is available, fragmentation can result. Collision with a rod or end-cap electrode can result in surface-assisted fragmentation of the ion, or more likely the neutralization and loss of the ion.

Figure 3:
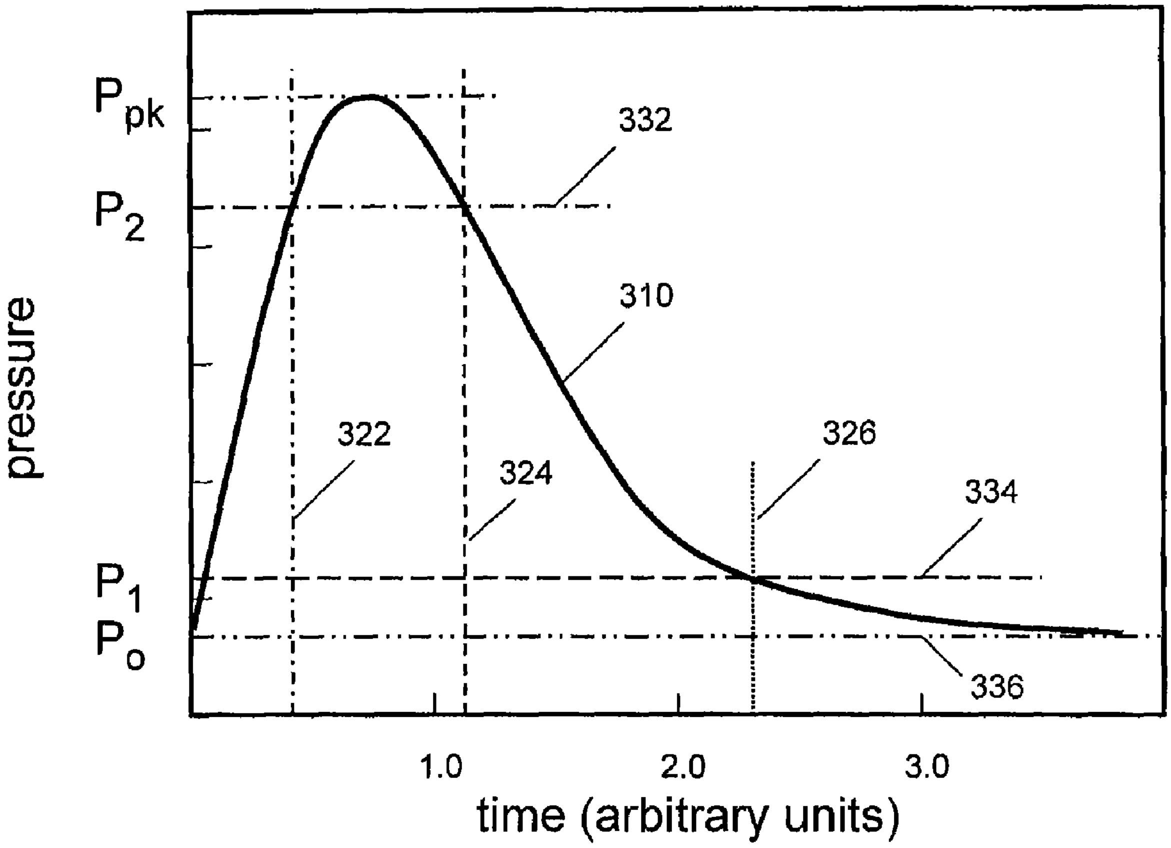
FIG. 3 is an illustrational plot representing a non-steady-state pressure condition within the ion-confinement region during and after injection of a neutral collision gas.

In various embodiments, the present methods confine ions within an ion trap and deliver a neutral gas into the ion trap 105 to create a non-steady-state pressure of greater than about $5.5\times10^{-5}$ Torr and less than about $5\times10^{-4}$ Torr within at least a portion of the trap for a first elevated pressure duration. For example, referring to FIG. 3, in various embodiments, the pressure elevates from a base operating pressure $P_0$ to a peak value $P_{pk}$. In various embodiments, the peak value can be attained at a time that substantially coincides with termination of gas injection, or can occur after termination of gas delivery depending upon the configuration of the gas-delivery apparatus and vacuum chamber geometry. The pressure, in various embodiments, is raised to a varying first elevated-pressure that stays elevated above an elevated-pressure value $P_2$ and below a peak value (e.g., $5\times10^{-4}$ Torr in various embodiments) for a first elevated-pressure duration schematically indicated as the region bounded by the lines 322, 324 in FIG. 3, and eventually pressure restores to the base operating pressure, $P_0$. In various embodiments, the peak pressure $P_{pk}$ attained during ion fragmentation is less than about $5\times10^{-4}$ Torr, the elevated-pressure duration is less than about 25 milliseconds, the pressure value $P_2$ is greater than about $5.5\times10^{-5}$ Torr; and the base operating pressure $P_0$ can be about $3.5\times10^{-5}$ Torr and, in various embodiments, is substantially steady-state. In various embodiments, the methods use a neutral collision gas pressure $P_{pk}$ of less than about $5\times10^{-4}$ Torr; and/or less than about $3\times10^{-4}$ Torr and/or in various embodiments, the methods use an elevated-pressure value $P_2$ greater than about $1\times10^{-4}$ Torr and/or greater than about $2\times10^{-4}$ Torr.

An auxiliary alternating electrical field is applied to the ion trap to impart kinetic energy to the ions and fragment them through collisions with the neutral gas. In various embodiments, an auxiliary alternating electrical field having an excitation amplitude less than about 500 $mV_{(0\text{-}pk)}$ is used. In various embodiments, the amplitude of the auxiliary alternating electrical field is less than about 250 $mV_{(0\text{-}pk)}$, less than about 100 $mV_{(0\text{-}pk)}$, less than about 50 $mV_{(0\text{-}pk)}$, in the range between about 5 $mV_{(0\text{-}pk)}$ to about 500 $mV_{(0\text{-}pk)}$, and/or in the range between about 5 $mV_{(0\text{-}pk)}$ to about 250 $mV_{(0\text{-}pk)}$. In various embodiments, the application of the auxiliary alternating electrical field is applied substantially at the same time as the pressure in the ion trap reaches a first elevated pressure (e.g., line 322 in FIG. 3). In various embodiments, the auxiliary alternating electric field is applied at substantially the same time that the pulsed valve is opened for gas injection, and the auxiliary field is terminated at substantially the same time that the valve is closed. In various embodiments, the duration of the application of the auxiliary alternating electrical field, the excitation time, extends past the duration of pressure elevation above an elevated-pressure value $P_2$.

In various embodiments, the excitation time is greater than about 10 ms, greater than about 20 ms, greater than about 30 ms, and/or in the range between about 5 ms and about 25 ms. In various embodiments, the first elevated-pressure duration is in the range between about 5 milliseconds to about 25 milliseconds. In various embodiments, the first elevated-pressure duration substantially corresponds to the time the pressure is greater than or equal an elevated-pressure value $P_2$.

In various embodiments of the methods employing a LIT, the methods are provided for application to a LIT having radial confinement electrodes (rods) 210 with substantially circular cross-sections. Examples of the behavior of ions in LIT's having trapping electrodes which are substantially circular in cross-section can be found in B. A. Collings, et al, *J. Am. Soc. Mass Spec.*, Vol. 14, No. 6 (2003) pp. 622-634 and U.S. Pat. No. 7,049,580 both of which are incorporated herein by reference in their entirety. Rods with circular cross-sections produce ion-trapping electric potentials having components in addition to pure quadrupolar trapping potentials produced by hyperbolic electrodes. The additional potential components can cause a de-phasing of the ion motion relative to the applied auxiliary potential, for example a slowing down and speeding up of oscillatory motion, as well as a cross coupling of motion into non-radial directions. In various embodiments, these effects restrain the amplitude of the ion's back-and-forth motion and aid in preventing collisions with the trap's rods. This is unlike the situation for traditional ion traps in which hyperbolic electrodes are used. In these instruments the trapping potentials are substantially purely quadrupolar, and the amplitude of the ion's oscillatory motion will increase linearly with time until the ion terminates on an electrode.

In various embodiments, provided are methods for use with a multipole linear ion trap having rods with substantially circular cross-section, comprising (a) retaining the ions in an ion-confinement region of the linear ion trap for a retention time; (b) creating a non-steady-state pressure increase within the ion-confinement region by delivering a neutral gas into the linear ion trap for at least a portion of the retention time to raise the pressure in the ion-confinement region to a varying first elevated-pressure has values which are in the range between about $5.5\times10^{-5}$ Torr to about $5\times10^{-4}$ Torr but greater than about $1\times10^{-4}$ Torr for a first elevated-pressure duration; (c) exciting at least a portion of the ions within the ion-confinement region by subjecting them to an auxiliary alternating electrical field having an amplitude of less than about 500 $mV_{(0\text{-}pk)}$ for an excitation time, the excitation time being less than the retention time; (d) reducing the pressure within the linear ion trap to a first restored pressure value prior to the end of the retention time; and (e) ejecting the ions from the linear ion trap at the end of the retention time. In various embodiments, the methods can be used to excite ions in a linear ion trap having rods with substantially circular cross-sections.

In various embodiments of the methods for fragmenting ions can provide fragmentation efficiencies of greater than about 80%, greater than about 90%, and greater than about 95%, for ions retained in the ion trap.

In various embodiments, the methods of the present teachings can reduce the time required to produce low-mass fragment ions, and thus enable the detection of fragments below the typical low-mass cut-off (LMCO) associated with the trap. The low-mass cut-off for an ion trap is typically defined as a mass below which an ion would have an unstable trajectory in the trap, and be ejected from the trap. Decreasing the time to fragment ions can reduce the retention time of the ions and thus allow low-mass ions to be ejected for subsequent processing (e.g., mass analysis) prior to their unstable trajectories removing them from the trap. The typical low-mass cut-off (LMCO) for a quadrupole LIT, absent the practice of the present teachings can be given by:

$$LMCO = \frac{m \cdot q}{0.908} \tag{1}$$

where m is the mass of the parent ion and q is the Mathieu stability parameter associated with the ion and trapping values, described below.

In a linear ion trap comprising a quadrupole, the Mathieu stability q parameter can be represented by:

$$q = \frac{4\, eV_{RF}}{m r_0^2 \Omega^2} \tag{2}$$

where e represents the charge of an ion of mass m, $V_{RF}$ represents the pole to ground amplitude of the trapping RF potential, Ω is the angular driving frequency of the RF, and $r_0$ represents the field radius often taken as the electrode separation.

Various embodiments of the methods of the present teachings create a non-steady-state pressure increase within the ion-confinement region of an ion trap by delivering a neutral gas into the ion trap. A variety of means can be used to deliver the neutral collision gas to the ion-confinement region of the ion trap to produce this non-steady state pressure increase. For example, the neutral gas can be delivered into the trap with a pulsed valve located near the ion-confinement region of the trap. Referring again to FIGS. 2A-2B, in various embodiments, a pulsed valve 230 having a gas-injection nozzle 222 is used to deliver gas from a gas supply 240, connected to the valve by, e.g., tubing 220. The nozzle 222 can be incorporated into the valve 230 with no tubing 220 between them.

In various embodiments, the pulsed valve can be of the type supplied by the Lee Company, Westbrook, Conn., U.S., having a response time of about 0.25 ms, a minimum pulse duration of about 0.35 ms, and an operational lifetime of about $250\times10^6$ cycles. Referring to FIG. 2A, in various embodiments, the nozzle can be located a distance $d_1$ 262 from the rods 210 and a distance $d_2$ 264 from the center of the ion-confining region 205. In various embodiments, $d_1$ is approximately 10 mm and $d_2$ is approximately 21 mm. In various embodiments, the pulsed valve is comprised of one or more of a substantially electrically conductive material, and/or substantially coated with conductive material so as to prevent electrical charging of the pulsed valve. In various embodiments, the pulsed valve is located no closer than 2.25 rod diameters from the center of the ion confinement region. In various embodiments, the pulsed valve is located at a distance away from the electrode array that is at least 3 times greater than the separation of adjacent rods.

The pulsed valve 230 can be operated remotely with control electronics to introduce a burst of gas into the ion trap. The injected neutral gas provides collision targets for the ions. The timing of the gas injection can be chosen to substantially coincide with the application of the auxiliary alternating potential.

In various embodiments, as gas is delivered from the nozzle 222 it can create a conically-shaped plume of gas. In various embodiments, the apparatus added for gas injection can be located such that the plume 224 substantially impinges on the ion-confinement region 205, facilitating efficient intermixing of the injected molecules with the trapped ions. In various embodiments, the nozzle itself can be designed to deliver a predetermined plume shape.

Various embodiments of the methods of the present teachings eject ions from the trap at the end of the ion retention time. In various embodiments, the pressure in the trap is reduced to a first restored-pressure value prior to ejection to facilitate, e.g., transfer of the ions to further ion optical and/or processing elements. In various embodiments, the first restored-pressure value can be selected, for example, to be the lesser of an allowed operating pressure imposed by ion detectors which may be present in the apparatus and/or a value chosen for efficient ejection of the ions from the trap, e.g., by mass selective axial ejection (MSAE). Generally, ion detectors are pressure sensitive instruments and must be operated below a safe operating pressure to avoid damaging the detector. This safe operating pressure can be selected as the first restored-pressure value.

Referring again to FIG. 3, the first restored-pressure value can be selected to be substantially equal to the base operating pressure, $P_0$, which in various embodiments can be lower than a safe operating pressure, $P_1$, of any ion detector used in combination with the ion trap. For example, the base operating pressure might be $5\times10^{-5}$ Torr and the safe operating pressure might be $9\times10^{-5}$ Torr. In various embodiments, the ion detector is turned off during delivery of the collision gas, and reactivated at a time when the pressure falls below the safe operating level, $P_1$, indicated by a time line 326 in the drawing.

Figure 4:
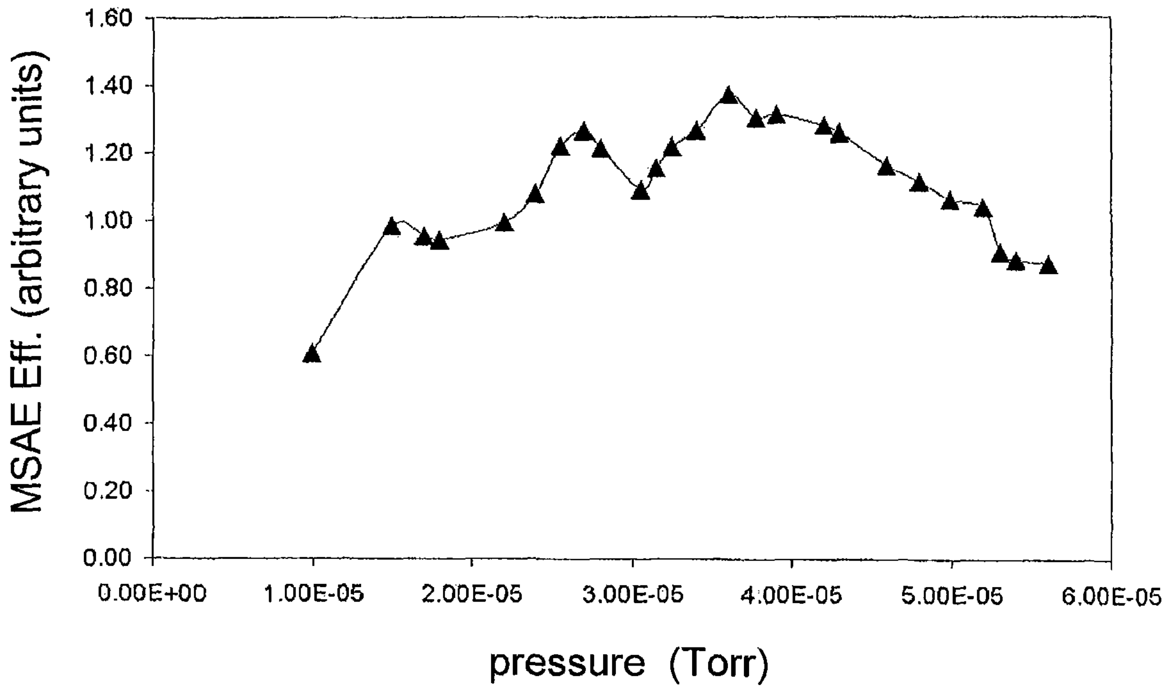
FIG. 4 is an experimentally-measured plot of mass selective axial ejection (MSAE) efficiency as a function of pressure.

Ejection processes, e.g., mass-selective axial ejection MSAE, can themselves have pressure dependency. An example of MSAE pressure dependency can be seen in the experimentally-determined plot of FIG. 4. This plot shows that the MSAE efficiency generally decreases for pressures of less than about $3.5\times10^{-5}$ Torr for the experimental configuration tested. In various embodiments, excessive detector noise occurring at pressures greater than about $5\times10^{-5}$ Torr can adversely affect MSAE measurements.

In various embodiments, MSAE is carried out in a range of pressures between about $2\times10^{-5}$ Torr to about $5.5\times10^{-5}$ Torr. In various embodiments, MSAE is carried out in a range of pressures between about $2\times10^{-5}$ Torr to about $7.5\times10^{-5}$ Torr. In various embodiments, MSAE is carried out in a range of pressures between about $2\times10^{-5}$ Torr to about $1\times10^{-4}$ Torr.

In various embodiments, the peak pressure $P_{pk}$ attained due to neutral collision gas delivery is within about a factor of ten of the base operating pressure, $P_0 \leqq 5\times10^{-5}$ Torr, for the ion trap. In various embodiments, reducing peak pressure can reduce, for ion chambers of the same volume and having the same vacuum pumping speeds, the pressure-recovery time, e.g., the time between by the lines 324 and 326 in FIG. 3 during which the chamber restores to pressure $P_1$, and thus, in various embodiments, ions which have been fragmented under conditions of lower peak pressure elevation can be made available for subsequent ion processing more quickly.

Numerical Simulations

Without being held to theory, numerical simulations are presented to further convey and facilitate understanding of the present teachings. It is to be understood that the rate of fragmentation of an ion, for example via dipole excitation, can be dependent upon a number of variables inter-related in a complex manner. For example, excitation amplitude, duration of the excitation, mass of the collision partner, efficiency of conversion of kinetic energy into internal energy of the ion, the rate of internal energy cooling of the ion through damping collisions with the background gas and/or radiative cooling, redistribution of the internal energy within the ion, density of the collision gas and the type of chemical bond that is fragmenting, etc. can all be factors. Here, results from studies carried out for a variety of ion masses, gas-injection durations, excitation amplitudes, excitation times, and pressures are presented.

An upper limit to the amount of energy available for deposition into the internal degrees of freedom (vibration and rotation) of an ion can be estimated by calculating the center-of-mass collision energy between the ion and the collision partner. The center-of-mass collision energy $E_{cm}$ can be determined from the equation, $$E_{cm} = E_{lab}\frac{m_2}{m_1 + m_2} \quad (3)$$

where $m_1$ is the mass of the ion, $m_2$ is the mass of the neutral collision partner and $E_{lab}$ is the kinetic energy of the ion in the laboratory frame of reference. During the process of dipolar excitation, e.g. application of an auxiliary alternating potential to the ion trap's electrodes, energy is fed into the ion in the form of kinetic energy, however, the ion can lose kinetic energy through collisions with neutral molecules in a collision gas that may be present, leaving the ion with kinetic energy, $E'_{lab}$, where the prime notation does not indicate a derivative but only a potentially different value of energy than that given by the variable $E_{lab}$. The amount of kinetic energy lost is the difference between the two values $E_{lab}$, $E'_{lab}$ and can be determined using the following equation:

$$E_{loss} = E_{lab} - E'_{lab} = E_{lab}\left(1 - \frac{(m_1^2 + m_2^2)}{(m_1 + m_2)^2}\right) \quad (4)$$

Using Eqn (3) and Eqn (4), the relation of $E_{cm}$ to $E_{loss}$ can be written as:

$$E_{cm} = E_{loss}\frac{m_1 + m_2}{2m_1} \quad (5)$$

which reduces to approximately $0.5E_{loss}$ when $m_1 \gg m_2$. During excitation the ion can have both high and low kinetic energies, depending upon the location in the ions' trajectory. Collisions with collision energies on the order of the thermal energy, e.g., various lower kinetic energy regions of a trajectory, can lead to either an increase or a decrease in the internal energy of the ion. The amount of energy available for internal excitation is proportional to the centre of mass collision energy.

The rate of energy input into the ion $E_{cm}$/collision/unit time during the excitation process affects the rate of ion fragmentation. The fragmentation rate of an ion can be increased provided the rate of energy input into the ion can be increased faster than the rate of thermalization is increased, and provided the ion does not collide with an electrode or is otherwise lost from the trap. Collisions with electrodes, for example, predominantly neutralize the ion, and result in its loss.

To better understand these processes and the present teachings, an ion-trajectory simulator was used to investigate the rate of energy input into an ion. The simulator takes into account the center-of-mass collision energy for each individual collision, the effects of thermal velocities for both the ion and the neutral collision gas, the effects of the RF confinement field (trapping alternating potential) and the effects of higher-order fields due to the round cross-sectional shape of the quadrupole electrodes.

The energy input rate, $E_{cm}$/collision/unit time, provides an upper limit to the amount of energy that can be transferred from kinetic energy into internal energy of the ion. It is found that this rate can be dependent upon the pressure in the trap and excitation amplitude $V_{exc}$. The excitation amplitude, $V_{exc}$, is taken here as the zero-to-peak amplitude of the auxiliary alternating potential applied to two of the quadrupole electrodes. The duration of energy gain for an ion can be dependent upon the excitation amplitude, e.g., if $V_{exc}$ is too high then the ions can attain high transverse motion amplitude and, e.g., collide with an electrode, and the energy-gain duration will be shortened.

Table 1 shows the results from simulations of ion fragmentation under three different conditions, designated A, B and C, within a linear ion trap having rods with substantially circular cross sections. The excitation amplitude, $V_{exc}$, listed in the third column represents the zero-to-peak amplitude of the auxiliary alternating potential applied to two of the quadrupole rods in the simulation. The resulting average duration of ion trajectories is listed in the fourth column, and represents the amount of time, on average, an ion undergoes oscillations within the trap before colliding with a rod. The energy input rate, $E_{cm}$/collision/unit time, the collisions per unit time, collisions/unit time, and the total center-of-mass collision energy, $E_{cm}$, acquired are listed in the adjacent columns. For the simulations, the collision partner was taken to be neutral nitrogen molecules, and the ion chosen was reserpine (m/z=609).

In cases A and B the pressure within the ion-confinement region was $3.5\times10^{-5}$ Torr, the maximum excitation period allowed was 100 ms, and the amplitudes of the auxiliary potential, $V_{exc}$, were 7.5 $mV_{(0\text{-}pk)}$ and 30 $mV_{(0\text{-}pk)}$, respectively. In case C the pressure was elevated to $3.5\times10^{-4}$ Torr, $V_{exc}$ was 30 $mV_{(0\text{-}pk)}$, and the excitation period was 25 ms. The tabulated results are obtained from an average of 10 ion trajectories, each with an individual set of initial staring conditions. For the simulations, ions were randomly distributed within a 1.0 mm radius of the axis of the trap. The ions were then cooled for a period of 5 ms at a pressure of 5 mTorr. Nitrogen was used as the neutral collision gas, and a collision cross-section of 280 Å was used. The final spatial coordinates and kinetic energies were used as input for the next stage of the simulation. In the next stage of the simulation, the collision frequency, scattering angle and initial RF phase were chosen randomly.

TABLE 1

| case | pressure mTorr | $V_{exc}$ $mV_{(0\text{-}pk)}$ | trajectory duration (avg) ms | $E_{cm}$/ collision/ unit time eV/ms | Collisions/ unit time/ ms | $E_{cm}$ (total) eV |
|---|---|---|---|---|---|---|
| A | 0.035 | 7.5 | 93 | 0.81 | 3.52 | 75.6 |
| B | 0.035 | 30 | 1.8 | 0.76 | 3.27 | 1.37 |
| C | 0.350 | 30 | 25 | 6.84 | 33.7 | 171 |

For the simulation corresponding to case A, the ion was, on average, accelerated for about 93 ms before gaining large enough transverse motion to collide with an electrode. Increasing the excitation amplitude to 30 $mV_{(0\text{-}pk)}$ (case B) was not seen to increase the rate of energy input into the ion $E_{cm}$/collision/unit time. Instead, the ion trajectory was seen in the simulation to terminate after 1.8 ms, and the total amount of $E_{cm}$ available for collisions was significantly reduced. For case B most of the ions in the simulation collided with a rod prior to receiving sufficient energy to fragment within the trap.

An elevation of the pressure to $3.5\times10^{-4}$ Torr during ion excitation and excitation at $V_{exc}$=30 $mV_{(0\text{-}pk)}$ in the simulation (case C) was seen to result in none of the ion trajectories terminating upon a quadrupole rod prior to the 25 ms upper time limit. The amount of $E_{cm}$/collision/unit time was seen to increase by a factor of about 8 over cases A and B. The total $E_{cm}$ available for collisions was seen to increase by more than a factor 2 over case A and more than a factor of 125 over case B, even though the maximum excitation time in the simulation was reduced from 100 ms for cases A and B to 25 ms for case C. The average duration of an ion trajectory increases in case C from case B, which was attributed to increased collisions with the neutral gas molecules. It is therefore believed, without being held to theory, that increasing the pressure during fragmentation in the low-pressure LIT can provide for an increase in the rate of energy input into the ion and the use of higher excitation amplitudes without substantial loss of ions due to loss from the trap, e.g., collisions with electrodes. It is believed, without being held to theory, that the collision gas acts as a buffer to dampen the transverse excursions of the ion trajectories.

EXAMPLES

Ion fragmentation experiments were carried out in a quadrupole linear ion trap. Details and results of these experiments are presented by way of examples. These examples illustrate various embodiments of the present teachings, but are not to be construed to limit the scope thereof.

Ion fragmentation experiments were carried out in a modified Applied Biosystems 4000 Q Trap® quadrupole linear ion trap. The ion-confining rods of the ion trap had substantially circular cross sections. A pulsed valve was used to deliver the collision gas (nitrogen), and the arrangement was similar to that shown in FIG. 2A. The pulsed valve was from The Lee Company, Westbrook, Conn., U.S., having a response time of 0.25 ms, an operational lifetime specified as 250 million cycles, and a minimum pulse duration of 0.35 ms. Opening the pulsed valve for a period of time allowed the pressure to be increased in at least a portion of the linear ion trap during dipolar excitation of the ions. Experiments were carried out using gas-injection pulse durations ranging from 5 ms to 100 ms with 25 ms as the typical duration. In these experiments, a vacuum-pressure interlock was set at a vacuum gauge reading of $9.5\times10^{-5}$ Torr, to protect the detectors. The vacuum gauge was attached to the vacuum chamber, which housed the LIT, and the pressure measured at the gauge was therefore lower than the pressure value in the ion-trapping region of the LIT after gas injection. The difference in pressure was due to the distance from the gas injection source, e.g. the pulsed valve, and dispersion of the injected gas. The pulsed valve was backed by 150 Torr of nitrogen, and the valve had an outlet aperture of 0.076 mm diameter. The base pressure in the LIT chamber, with the pulsed valve closed, was $3.7\times10^{-5}$ Torr. The pulsed valve was located as close to the linear ion trap as possible, without interfering with the RF trapping fields. In the experiments, the valve's orifice was located about 21 mm from the center of the quadrupole rod assembly, for example the distance 264 in FIG. 2A was about 21 mm. In various embodiments, the proximal location of the valve, or its output orifice, to the ion-confinement region can reduce the total amount of injected gas required for a desired elevation of pressure within the ion confinement region.

Fragmentation experiments were carried out for five compounds, listed in Table 2, spanning a mass range from 129 m/z to 514.7 m/z. After dissociation the ion fragments were analyzed in a mass spectrometer. Fragmentation efficiencies were calculated for each compound by integrating the fragmentation mass spectra substantially over the mass ranges shown in Table 2. Samples (e.g., 100 pg/μl of the compounds below in Table 2) were infused at 10 μl/min. Data was collected using excitation periods from 5 ms to 200 ms and excitations were carried out at Mathieu q=0.236.

TABLE 2

| compound (mode) | ion mass m/z | mass range integrated m/z |
|---|---|---|
| Fluorouracil (5-FU) (−ve) | 129.0 | 35 to 119 |
| Caffeine (+ve) | 195.2 | 50 to 190 |
| Caffeine (+ve) | 138.0 | 50 to 135 |
| Lidocaine (+ve) | 235.3 | 50 to 230 |
| Taurocholic Acid (−ve) | 514.7 | 130 to 513 |

Example 1

Caffeine

Figure 5:
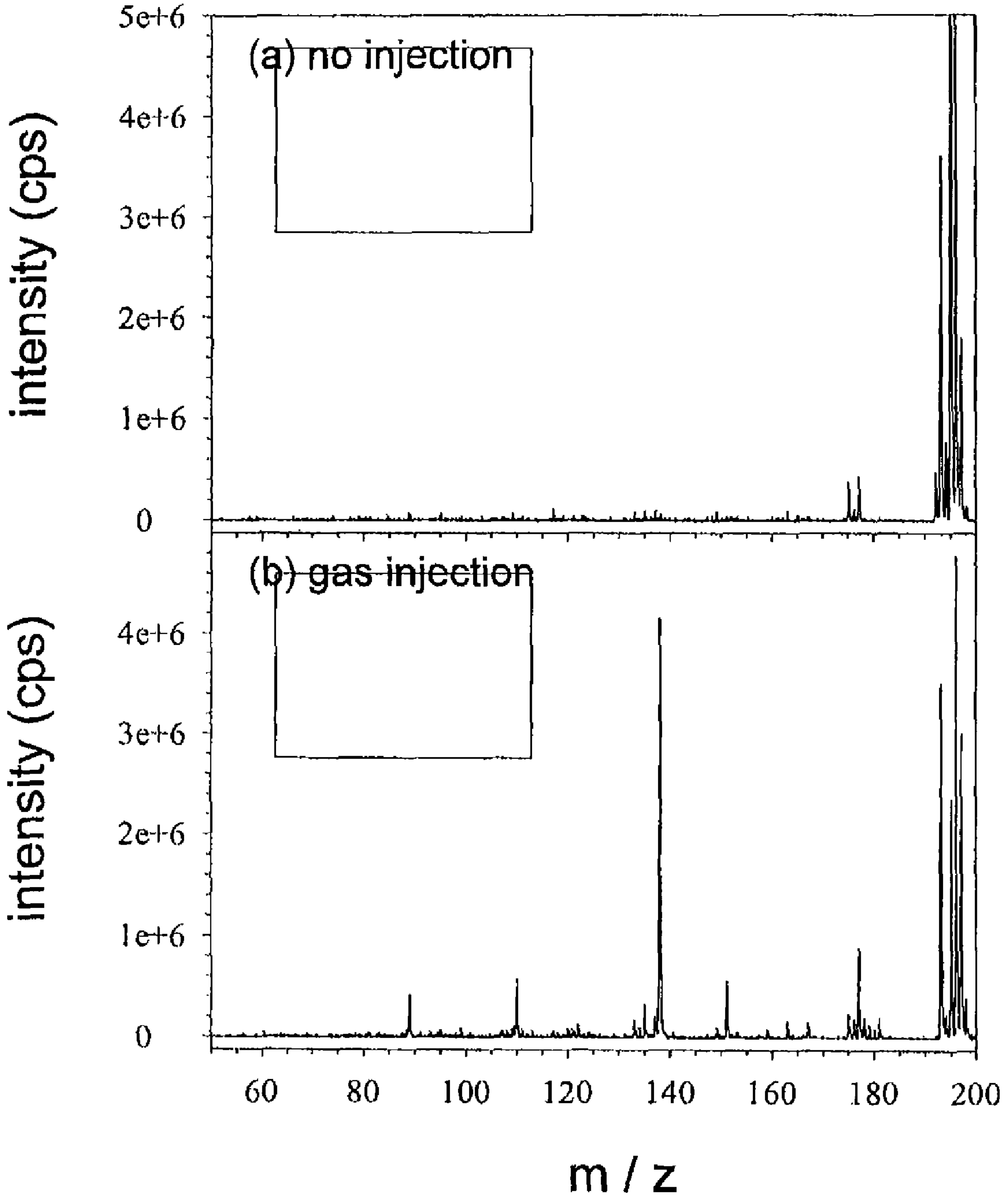
FIG. 5 compares mass spectra obtained from the fragmentation of a caffeine ion (m/z=195.2): (a) without injection of the gas of collision molecules, (b) with gas injection.

A comparison of the fragmentation of a caffeine ion, m/z=195, without, and with, injection of a neutral collision gas of neutral collision is shown in FIG. 5. The top spectrum (a) corresponds to the condition where no collision gas is injected during fragmentation, and it yields a 2.1% fragmentation efficiency when exciting the parent ions at 12.5 $mV_{(0\text{-}pk)}$ amplitude in a base pressure of $3.7\times10^{-5}$ Torr. The bottom spectrum shows 13.1% fragmentation efficiency when exciting the same ion at an amplitude of 21.5 $mV_{(0\text{-}pk)}$ with the pulsed valve used to inject the collision gas. For each trial the excitation time was 25 ms. In this experiment the injection of the collision gas increased the fragmentation efficiency by more than a factor of six.

Example 2

Lidocaine

Figure 6:
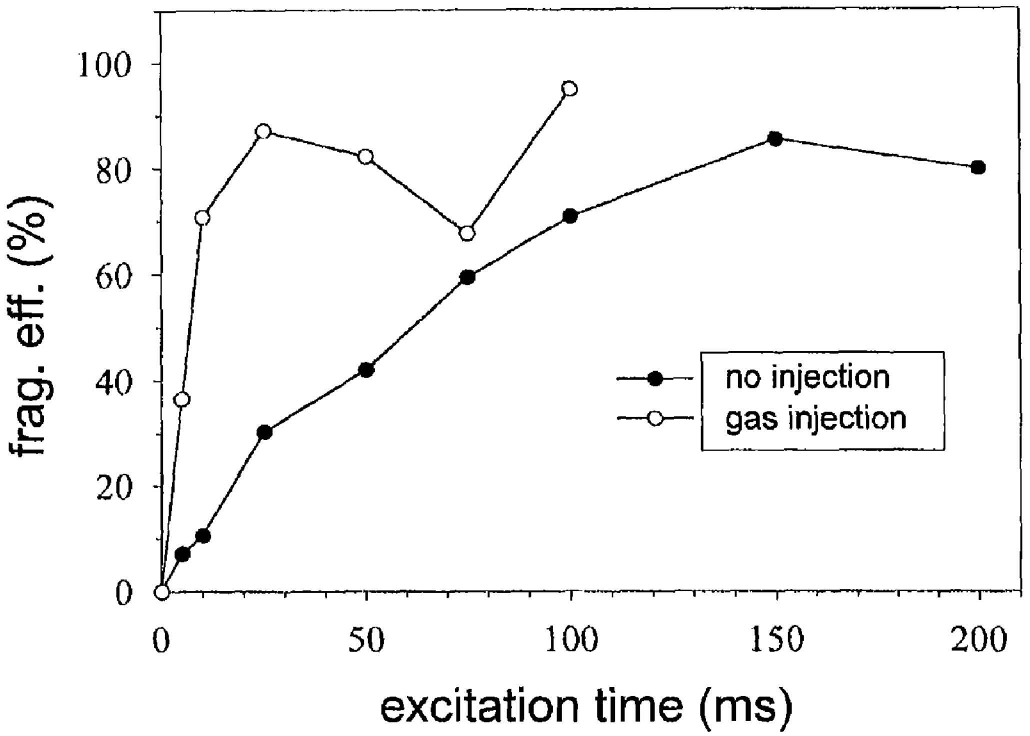
FIG. 6 shows two plots of fragmentation efficiency of a lidocaine ion (m/z=235) as a function of the excitation time: (open circles) with injection of the gas of collision molecules, (filled circles) without gas injection.

Without injection of the collision gas, less fragmentation for short excitation times was observed. Referring to FIG. 6, the fragmentation efficiency for a Lidocaine ion, m/z=235, with (open circles) and without (filled circles) collision gas injection, is shown. For an excitation time of 10 ms the fragmentation efficiency is about 10% without injection and about 75% with injection, a gain in fragmentation efficiency by a factor of about 7.5. For an excitation time of 25 ms the gain in efficiency drops to about 2.9, and at 100 ms the gain drops even further to about 1.3. The data shows that the fragmentation efficiency, with gas injection, for this ion does not improve significantly for excitation times beyond about 25 ms, whereas the fragmentation efficiency, without gas injection, for the same ion slowly improves for excitation times up to 150 ms. However, using the present teachings the same efficiency seen at 150 ms without collision gas can be obtained in about 25 ms with collision gas using the present teachings.

Example 3

Excitation Period

Figure 7:
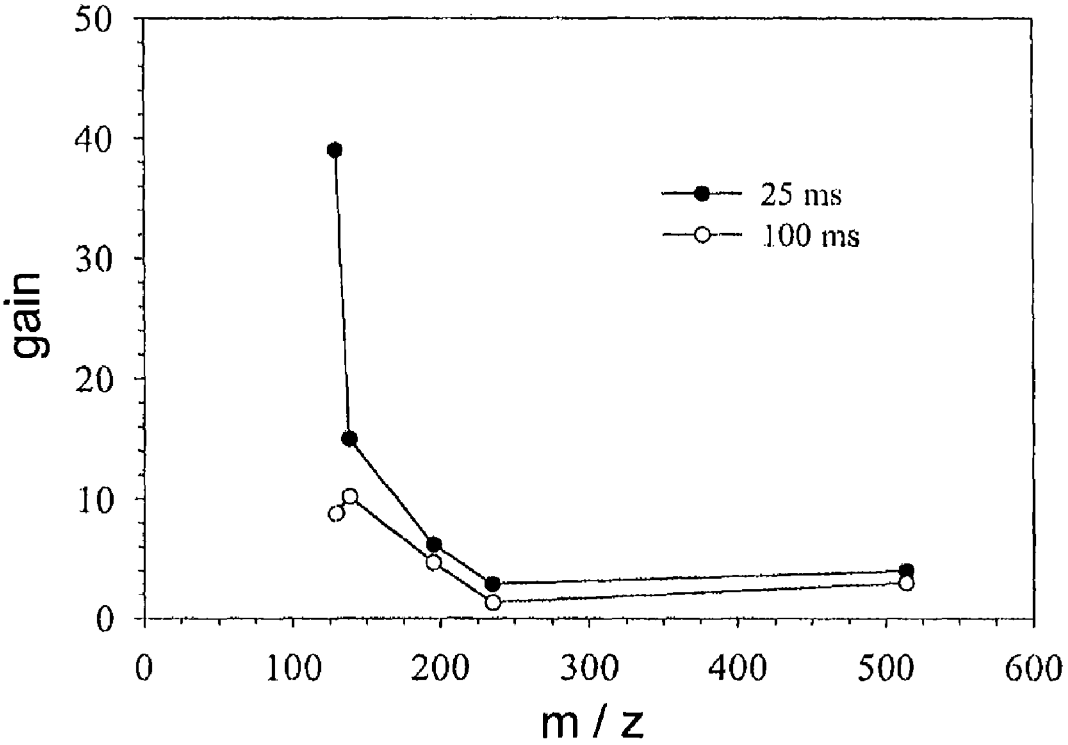
FIG. 7 compares gain in fragmentation efficiencies for ions of different m/z ratios excited for two different periods: 25 ms and 100 ms. The largest gains in fragmentation efficiency are observed for shorter excitation periods and smaller m/z ratios.

A plot of the gain in ion fragmentation efficiency under conditions of collision gas injection compared to conditions without gas injection for various m/z ratios for two different excitation periods is shown in FIG. 7. The ions fragmented were those listed in Table 2. Two data sets are shown corresponding to excitation times of 25 ms (filled circles) and 100 ms (open circles). For each measurement the excitation amplitude was selected to maximize fragmentation of the parent ion. The data of FIG. 7 shows that the observed gains in fragmentation efficiency are greatest for short excitation times and low ion masses.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method for fragmenting ions comprising:

(a) retaining the ions in an ion-confinement region of an ion trap for a retention time;

(b) creating a non-steady-state pressure increase within the ion-confinement region by delivering a neutral gas into the ion trap for at least a portion of the retention time to raise the pressure in the ion-confinement region to a varying first elevated-pressure in the range between about $5.5\times10^{-5}$ Torr to about $5\times10^{-4}$ Torr for a first elevated-pressure duration;

(c) exciting at least a portion of the ions within the ion-confinement region by subjecting them to an auxiliary alternating electrical field having an amplitude of less than about 500 $mV_{(0\text{-}pk)}$ for an excitation time having a range between about 5 milliseconds to about 25 milliseconds, the excitation time being less than the retention time;

(d) reducing the pressure within the ion trap to a first restored-pressure value prior to the end of the retention time; and (e) ejecting the ions from the ion trap at the end of the retention time.

2. The method of claim 1 wherein the ion trap comprises a linear ion trap comprising one or more of a RF quadrupole, a RF hexapole, and a RF multipole.

3. The method of claim 1 wherein the ion trap comprises a quadrupole linear ion trap having radial confinement electrodes with substantially circular cross sections.

4. The method of claim 1 wherein delivering the neutral gas comprises injection of the neutral gas from one or more pulsed valves.

5. The method of claim 1 wherein the neutral gas comprises one or more of hydrogen, helium, nitrogen, argon, oxygen, xenon, krypton, methane, and combinations.

6. The method of claim 1 wherein the varying first elevated-pressure varies in the range between about $5.5\times10^{-5}$ Torr to about $3\times10^{-4}$ Torr.

7. The method of claim 1 wherein varying the first elevated-pressure varies in the range between about $1\times10^{-4}$ Torr to about $5\times10^{-4}$ Torr.

8. The method of claim 1 wherein the amplitude of the auxiliary alternating potential is less than about 250 $mV_{(0\text{-}pk)}$.

9. The method of claim 1 wherein the amplitude of the auxiliary alternating potential is in the range between about 10 $mV_{(0\text{-}pk)}$ to about 50 $mV_{(0\text{-}pk)}$ for ions having a mass in the range between about 50 Da to about 500 Da.

10. The method of claim 1 wherein the amplitude of the auxiliary alternating potential in step (c) is in the range between about 50 $mV_{(0\text{-}pk)}$ to about 250 $mV_{(0\text{-}pk)}$ for ions having a mass in the range between about 500 Da to about 5000 Da.

11. The method of claim 1 wherein the first elevated-pressure duration is in the range between about 5 milliseconds to about 25 milliseconds.

12. The method of claim 1 wherein the exciting at least a portion of the ions in step (c) initiates at substantially the same time as the time at which the pressure in the ion-confinement region elevates above about $5.5\times10^{-5}$ Torr in step (b).

13. The method of claim 1 wherein the excitation time is greater than about 10 milliseconds.

14. The method according to claim 1 wherein the first restored-pressure value is in the range between about $2\times10^{-5}$ Torr to about $5.5\times10^{-5}$ Torr.

15. The method according to claim 1 comprising after step (c) and before step (e) the steps of:

delivering a neutral cooling gas into the ion-confinement region to raise the pressure in the ion-confinement region to a second elevated-pressure value that is greater than about $8\times10^{-5}$ Torr for a second elevated-pressure duration;

evacuating a portion of the neutral cooling gas to reduce the pressure within the ion trap to a second restored-pressure value, wherein the second restored-pressure value is in the range between about $2\times10^{-5}$ Torr to about $5.5\times10^{-5}$ Torr.

* * * * *